United States Patent [19]

Jakahi

[11] 4,455,153
[45] Jun. 19, 1984

[54] APPARATUS FOR STORING SOLAR ENERGY IN SYNTHETIC FUELS

[76] Inventor: Douglas Y. Jakahi, 94-037 Huo Pl., Mililani Town, Hi. 96786

[21] Appl. No.: 71,983

[22] Filed: Sep. 4, 1979

Related U.S. Application Data

[63] Continuation-in-part of Ser. No. 903,074, May 5, 1978, abandoned.

[51] Int. Cl.³ .................................................. C10J 3/20
[52] U.S. Cl. ........................................ 48/62 R; 48/73; 48/111; 48/DIG. 9; 126/439; 422/187; 422/235; 422/186
[58] Field of Search ................. 250/527; 126/438, 439, 126/440; 48/92, 94, 75, 79, 73, 111, 197 R, 202, DIG. 9, 62 R; 422/187, 234, 235, 198, 186, 186.3

[56] References Cited

U.S. PATENT DOCUMENTS

| | | | |
|---|---|---|---|
| 1,951,403 | 3/1934 | Goddard | 126/440 |
| 2,760,920 | 8/1956 | Olsen | 126/270 |
| 3,171,403 | 3/1965 | Drescher | 126/270 |
| 3,252,773 | 5/1966 | Solomon et al. | 48/202 |
| 3,615,299 | 10/1971 | Fischer | 48/202 |
| 3,708,270 | 1/1973 | Birk et al. | 48/202 |
| 3,710,737 | 1/1973 | Birk | 110/342 |
| 3,916,617 | 11/1975 | McKenzie | 48/203 |
| 3,973,552 | 8/1976 | Ervin, Jr. et al. | 126/400 |
| 3,993,458 | 11/1976 | Antal | 48/202 |
| 4,017,271 | 4/1977 | Barclay et al. | 48/197 R |
| 4,018,212 | 4/1977 | Hein et al. | 126/270 |
| 4,050,907 | 9/1977 | Brimhall | 48/111 |
| 4,055,948 | 11/1977 | Kraus et al. | 60/641 |
| 4,149,856 | 4/1979 | Keller | 48/73 |
| 4,158,697 | 6/1979 | Cramer | 48/73 |

FOREIGN PATENT DOCUMENTS

2386601 12/1978 France .................. 48/197 R

Primary Examiner—Peter F. Kratz

[57] ABSTRACT

Processes and apparatus for storing solar energy in synthetic fuels are disclosed. The disclosed processes include the steps of introducing steam and carbonaceous material such as coal, lignite, peat, solid organic wastes, or heavy oils into a molten gasification medium such as one or more molten salts and supplying sufficient solar heat to the gasification medium to maintain it in the molten state at a temperature at which the carbonaceous material and steam react to produce a synthesis gas product including a synthetic fuel gas or gases. Disclosed processes include the step of adding solar absorptivity enhancing dopant material to the gasification medium. Disclosed processes include the step of supplying solar heat to the gasification medium by directing concentrated solar radiation onto the gasification medium, rather than directing the solar radiation onto a separate body of material for indirectly heating the gasification medium. In disclosed apparatus the reactor vessel containing the gasification medium combined with carbonaceous material and steam is located at ground level and concentrated solar rays from a heliostat farm are directed downwardly from a horizontal reflector, through a window, onto the gasification medium.

1 Claim, 9 Drawing Figures

APPARATUS FOR STORING SOLAR ENERGY IN SYNTHETIC FUELS

CROSS-REFERENCE TO RELATED APPLICATION

This application a is continuation-in-part of U.S. patent application Ser. No. 903,074, filed May 5, 1978 and now abandoned.

BACKGROUND OF THE INVENTION

1. Field of the Invention

My invention relates to processes and apparatus for storing solar energy in synthetic fuels, and more particularly to processes and apparatus for thus storing solar energy which employ molten gasification media.

2. Prior Art

The use of solar heating to produce synthetic fuel, thus storing solar energy in the synthetic fuel product, is taught in U.S. Pat. No. 3,993,458, issued to Michael J. Antal, Jr., on Nov. 23, 1976.

More particularly, Antal teaches that a solar heat fluidized reactant bed of char and organic material may be used to produce synthesis gas by gasification reactions. According to Antal, the synthesis gas produced by such gasification reactions can be used as a fuel, as a chemical feedstock, or as a raw material in the production of methanol. In the process of Antal, steam, carbon dioxide, or a mixture of these gases is used as the working fluid, and is heated in a tower top solar furnace. This working fluid is used to fluidize the reactant bed of char and solid organic material.

In the single structural embodiment of Antal, quartz windows are used to allow concentrated solar radiation to enter the bottom of a jacket surrounding the fluidized bed reactor and then to enter the bottom of the reactor.

In this embodiment, the working fluid is introduced into the jacket near the top portion of the jacket. The working fluid then flows to the bottom of the jacket, around the fluidized bed reactor. The bottom of Antal's jacket is supplied with a quartz window through which concentrated solar rays pass. These concentrated solar rays are used to heat the working fluid of Antal to a moderately high temperature, e.g., 700° C. to 1100° C. Antal's heated working fluid then enters the bottom of Antal's fluidized bed reactor through a second (perforated) quartz window and is used in the reactor to fluidize the reactant bed of char and organic material.

While the solar heated working fluid is thus entering Antal's fluidized bed reactor from the bottom, the organic material to be gasified is charged into the fluidized bed reactor from the top through a feed hopper and airlock system.

In accordance with the teachings of Antal, a catalyst of cobalt molybdate or $NzHCO_3$ is mixed with the organic material to be gasified before it is charged to the fluidized bed reactor. The Organic material used in the process of Antal may, of course, be comminuted to a degree dependent upon the economics of the system as determined by those having ordinary skill in the art.

In the device of Antal, the organic feed material is pyrolyzed as it is heated by the working fluid. The products of the resulting pyrolysis reactions in the fluidized bed reactor of Antal include synthesis gas, e.g., a mixture of $CO$, $H_2$, $CH_4$, $CO_2$, and $H_2O$, ashes, tars, oils, liquors, and char.

In the device of Antal, the solid char migrates to the lower section of the fluidized bed reactor where it is heated by the concentrated solar radiation passing through the imperforate window in the bottom of the jacket, and thence through the perforated window in the bottom of the reactor, and impinging upon the lower surface of the char.

The method and apparatus of Antal do not appear to be adapted to continuous processing of organic materials, since the catalyst of Antal is recovered by soaking the ash residue remaining after the gasification of the organic material in water, and no means is shown in the device illustrated in Antal for continuous removal of the ash residue.

Further, the fluidized bed reactor and surrounding jacket of the device of Antal must be insolated from below, rendering devices incorporating the teachings of Antal costly because high-strength support structures must be provided to elevate not only Antal's fluidized bed reactor and surrounding jacket, but also the associated feed stock hopper, air lock, and gas tight seals. In addition, these high-strength support structures for elevating the major portions of the Antal device must be constructed and arranged so that they do not substantially block the heliostat-directed solar radiation from reaching the quartz window located at the bottom of Antal's reactor jacket.

Moreover, the solid material handling means for charging organic material into Antal's refuse hopper must comprise an elevated structure extending at one end above the upper edge thereof, and yet at the same time must not substanially block the solar radiation directed by heliostats onto the quartz window at the bottom of Antal's reactor jacket. Again, as with the support structure for his fluidized bed reactor, etc., solid material handling means suitable for supplying carbonaceous material to Antal's refuse hopper is nowhere shown or described, however broadly, in Antal.

In addition, the gaseous gasification medium of Antal is inherently inferior in solar radiation absorptivity to molten solid gasification media, and thus processes for storing solar energy in synthetic fuels which employ molten solid gasification media will be characterized by higher efficiency of conversion of solar insolation into heat and will reduce capital equipment cost as compared with the method and apparatus of Antal.

Further, the gaseous gasification medium of Antal inherently possesses a much lower thermal conductivity per unit volume than do molten solid gasification media, and thus the efficiency of heat transfer to the carbonaceous material in devices embodying the invention of Antal will be less efficient than the corresponding heat transfer in devices employing molten solid gasification media, and the gasification reactor vessel of Antal will be considerably larger than optimum. The greater-than-optimum size of Antal's reactor will, of course, exacerbate the problems of elevatedly mounting Antal's reactor, etc., discussed hereinabove.

Yet further, the gaseous gasification medium of Antal must be passed through Antal's fluidized bed reactor at high gas velocities in order to maintain the carbonaceous material in the reactor in a fluidized state.

It follows, then, that large amounts of steam and/or carbon dioxide are needed to maintain the carbonaceous material in Antal's reactor in the fluidized state.

Since large amounts of steam and/or carbon dioxide are needed to maintain the fluidized state in the reactor of Antal, the amount of steam and/or $CO_2$ in the raw product synthesis gas produced by the reactor of Antal will be much greater than the percentage of extraneous gases in the synthesis gas product of a plant employing a molten solid gasification medium.

Additionally, Antal does not teach method or means whereby to separate his raw synthesis gas from the carbonaceous material and char in the fluidized bolus or bed in his reactor. It appears evident from the teachings of Antal, however, and the fact that large amounts of Antal's gaseous gasification medium (steam and/or carbon dioxide) must be passed at high velocity through his fluidized bed, that a substantial portion of the carbonaceous material charged to Antal's reactor, and possibly a substantial portion of the char generated in Antal's reactor, will be emitted from Antal's reactor along with the raw synthesis gas product and ash emitted therefrom. This entrained carbonaceous material, and possibly char, will have to be separated from the ash and synthesis gas and returned to Antal's fluidized bed reactor if a high rate of conversion of carbonaceous material to synthesis gas is to be maintained in accordance with the teachings of Antal. However, neither method nor apparatus for thus separating carbonaceous material and char from the raw synthesis gas product of the reactor of Antal is taught anywhere in Antal. It follows that even were one having ordinary skill in the art to supply such a separation process for use in connection with the teachings of Antal, it might well be a costly process, substantially affecting the overall economics of the Antal process.

Finally, it should also be recognized that the gaseous gasification medium of Antal suffers from two additional deficiencies, viz., that the gasification medium does not, as do certain molten solid gasification media, serve as a catalyst for the gasification process taking place in the reactor, and that, unlike molten solid gasification media, the solar-absorbing properties of Antal's gaseous gasification medium cannot be enhanced by the addition thereto of suitable dopants.

Also, the gaseous gasification medium of Antal is very poorly adapted, if adapted at all, to employment in a multi-stage solar gasification process in which a separate working fluid is heated by insolation, and this working fluid in turn heats the gasification medium. Such a multi-stage process permits the selection of an optimum working fluid for direct insolation, i.e., a working fluid having characteristics such as good solar radiation absorptivity, chemical inertness, and stability at high temperatures.

Processes and apparatus for the gasification of carbonaceous materials into synthesis gas using molten solid gasification media are disclosed not only in prior U.S. patents but also in the technical literature. Among such prior U.S. patents are U.S. Pat. Nos. 3,708,270; 3,567,412; 3,252,773; and 3,916,617. In these patents, a portion of the carbon in the carbonaceous material feedstock being gasified is reacted with a limited amount of oxygen to provide the heat necessary to sustain the endothermic gasification reaction in the gasification reactor vessel. None of these patents makes any mention of the employment of solar radiation as an alternative to the reaction of oxygen with part of the carbon in the carbonaceous material to provide the necessary process heat. A fortiori, none of these patents teaches solar energy as the heat source in their disclosed carbonaceous material gasification processes. Typical technical articles disclosing prior art molten solid gasification medium processes for use in the gasification of carbonaceous materials into synthesis gas are found in the magazine *Chemical Engineering Progress*, March, 1973, Volume 69, No. 3. Of particular interest is the article in that journal entitled Kellog's Coal Gasification Process, commencing at page 31, and The COED Process Plus Char Gasification, commencing at page 43. Reference may also be had to the text *New Energy Technology*, by H. C. Hottel and J. B. Howard, 1971, The Massachusetts Institute of Technology. These technical publications like the above-cited U.S. patents, do not suggest the great advantages to be derived from the employment of solar energy as the heat sources in the described processes, nor teach the processes and apparatus for achieving these great advantages which are uniquely taught herein.

SUMMARY OF THE INVENTION

It is accordingly an object of the present invention to provide greatly improved processes and apparatus for storing solar energy in synthetic fuels.

It is a further object of my invention to provide continuous processes for storing solar energy in synthetic fuels and apparatus for use in employing those processes.

It is a yet further object of my invention to reduce the cost of apparatus for storing solar energy in synthetic fuels.

It is an additional object of my invention to provide apparatus for storing solar energy in synthetic fuels which can be situated at ground level, rather than maintained in an elevated position by costly support structures.

It is another object of my invention to provide apparatus for storing solar energy in synthetic fuels which may be insolated from above, rather than from below.

It is yet another object of my invention to provide processes and apparatus for storing solar energy in synthetic fuels in which the amount of carbon dioxide released to the atmosphere is reduced.

It is a further object of my invention to provide processes and apparatus for storing solar energy in synthetic fuels in which the amount of coal, lignite, peat, or other carbonaceous material mined per unit energy of synthetic fuel is reduced, thus reducing damage to the ecostructure due to strip-mining or the like.

It is a yet further object of my invention to provide processes and apparatus for storing solar energy in synthetic fuels which result in reduction of the overall heat load into the atmosphere.

Other objects of my invention will in part be obvious, and will in part appear hereinafter.

My invention, accordingly, comprises the several steps and the relation of one or more of such steps with respect to each of the others, and the apparatus embodying features of construction, combinations of elements, and arrangements of parts which are adapted to effect such steps, all as exemplified in the following detailed disclosure, and the scope of my invention will be indicated in the appended claims.

In accordance with a principal feature of my invention, a process for storing solar energy in synthetic fuel comprises introducing carbonaceous material and steam into a molten gasification medium, supplying sufficient solar heat to said gasification medium to maintain said gasification medium in the molten state and at a processing temperature at which said carbonaceous material and steam react to produce gaseous product, and withdrawing said gaseous product as a product of the process.

In accordance with another principal feature of my invention, the solar heat supplied to said molten gasification medium in carrying out said process is supplied to said molten gasification medium by directing concentrated solar radiation thereupon.

In accordance with yet another principal feature of my invention, the solar heat supplied to said gasification medium in carrying out said process is supplied by means of an intermediate working fluid, which working fluid is selected for its high solar absorptivity.

In accordance with another principal feature of my invention, said gasification medium is impinged by solar radiation and contains a solar radiation absorption enhancing dopant.

In accordance with yet another principal feature of my invention, apparatus for storing solar energy in synthetic fuel comprises a reactor vessel containing a molten gasification medium and said reactor vessel is provided with a window in its top surface through which window concentrated solar radiation is directed downwardly from a substantially horizontal reflector onto said gasification medium.

In accordance with yet another principal feature of my invention, said reactor vessel is provided with partition means defining with the portion of said reactor vessel lying above said gasification medium a first chamber having said window in its upper surface and a second chamber, said partition extending into said molten gasification medium and defining below the surface thereof an opening into said first chamber, the means for transferring steam and carbonaceous material into said reactor vessel passing into said second chamber at a point above said opening into said first chamber, whereby said window is protected from said molten gasification medium by a body of gaseous reaction product in the upper part of said first chamber.

For a fuller understanding of the nature and objects of my invention reference should be had to the following detailed description, taken in connection with the accompanying drawings.

DESCRIPTION OF THE PREFERRED EMBODIMENTS

Figure 1:
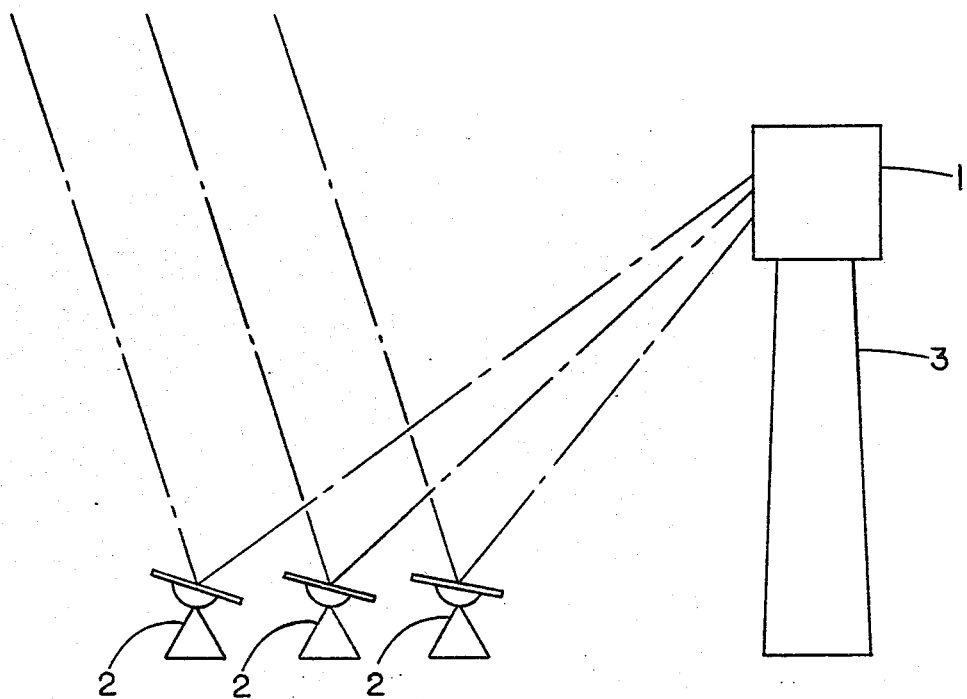
FIG. 1 is a schematic diagram of a prior art central receiver solar furnace.

Referring now to FIG. 1, there is schematically shown a central receiver solar furnace of well-known type. The central receiver solar furnace of FIG. 1 comprises a central receiver 1 which is to be heated by directly absorbing concentrated solar radiation. The central receiver solar furnace of FIG. 1 further comprises a large plurality of tracking heliostats 2, each adapted to concentrate solar radiation upon receiver 1. As is well-known to those having ordinary skill in the art, the tracking heliostats 2 serve to concentrate the solar radiation from a large area, viz., the total area of all of the heliostats 2 upon the small area of central receiver 1. In the well-known manner, the heliostats 2 are so disposed as to prevent each heliostat from interfering with solar radiation travelling from any other heliostat to central receiver 1. In relatively flat terrain, central receiver 1 will be situated at the top of a tower 3 (FIG. 1) to prevent the blockage of solar radiation reflected by any heliostat 2 by any other heliostat 2. Tower 3 may, of course, in the well-known manner be eliminated where a natural terrain feature such as a hill is available to serve in its place.

Figure 2:
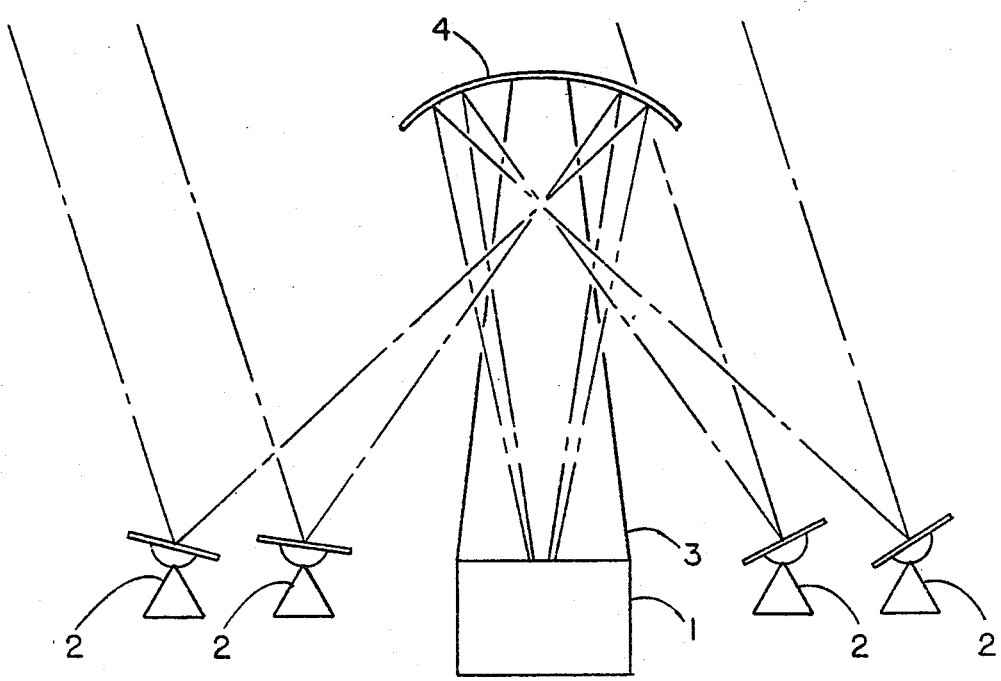
FIG. 2 is a schematic diagram of a solar furnace of the type used in principal embodiments of my invention.

Referring now to FIG. 2, there is shown a modified central receiver solar furnace which is particularly adapted to carrying out the processes of my invention. As seen in FIG. 2, receiver 1 is mounted at ground level and the concentrated solar radiation from tracking heliostats 2 is directed upon receiver 1 by means of a substantially horizontal parabolic reflector 4. This structural feature of my invention can be important in reducing capital plant expenditure, since some prior art central receiver solar furnaces employ receiver supporting towers 1,000 feet high, or higher. As will be evident to those having ordinary skill in the art, informed by the present disclosure, reflector 4 will not be horizontally disposed in all embodiments of my invention. In some embodiments, central receiver 1 may be disposed at one side of reflector 4, rather than directly below reflector 4, and heliostats 2 may be sited to one side of reflector 4, thus making it possible to dispose reflector 4 in a more vertical position. In some embodiments of my invention the melting of the initially solid gasification medium may be carried out by means of the concentrated solar radiation reflected from heliostats 2, and the gasification medium may thus be melted and brought to a desired gasification temperature, which will generally be in the range of 700° C. to 1100° C.

Figure 3:
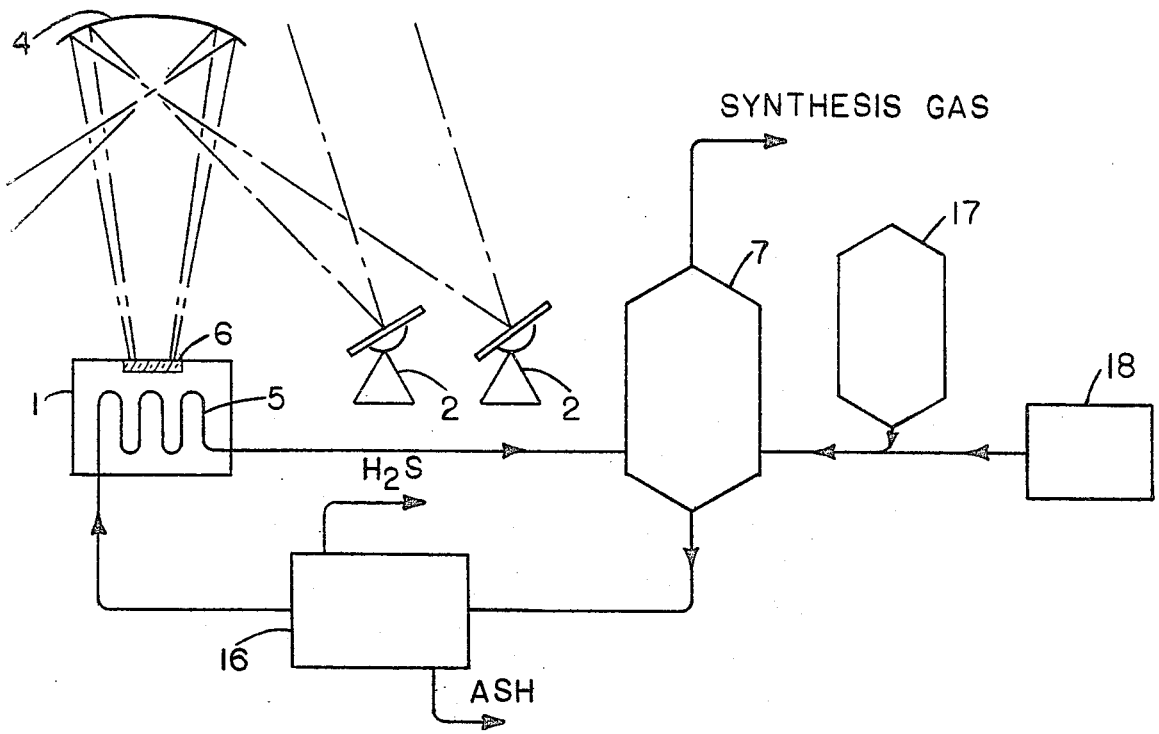
FIG. 3 is a schematic diagram of a first preferred embodiment of my invention, in which the solar energy central receiver is at ground level below a tower-mounted reflector.

Referring now to FIG. 3, it will be seen that the central receiver 1 of the first preferred embodiment of my invention is supplied with concentrated solar radiation by means of a plurality of tracking heliostats 2 and a substantially horizontal parabolic reflector 4 disposed substantially directly above central receiver 1.

In many embodiments of my invention, including said first preferred embodiment, the molten gasification medium will be a molten salt. It is to be understood, however, that mixtures of molten salts may also be employed as the molten solid gasification medium in carrying out the processes of my invention. Thus, the term "molten salt" as used hereinbelow also embraces mixtures of molten salts.

In accordance with the first embodiment of my invention as illustrated in FIG. 3 the molten salt gasification medium is heated as it flows through tubes 5 contained in central receiver 1. Tubes 5, may, of course, be replaced by a single closed vessel or container having suitable inlet and outlet means.

As also seen in FIG. 3, reflector 4 reflects concentrated solar rays to central receiver 1. The concentrated solar rays pass through a transparent window 6 in the top of central receiver 1 and thereafter impinge upon tubes 5. Transparent window 6 prevents heat loss from central receiver 1. Tubes 5 in central receiver 1 are heated to a high temperature by the impingent solar radiation. Tubes 5 may be provided with solar radiation absorbing means such as fins or plates. A selective coating may be employed to increase the efficiency of solar radiation absorption by maximizing the ratio of absorptivity of solar radiation to emissivity of thermal radiation from the solar radiation absorption surfaces.

The thus heated molten salt is conveyed by suitable piping arrangements to a gasification reactor vessel 7.

Alternatively, in accordance with my invention, a working fluid other than molten salt is heated in tubes 5, which may be fabricated from refractory material, and this alternative working fluid is passed by suitable piping to a heat exchanger, e.g., located in vessel 7, by which the solar heat is transferred from the alternative working fluid to the molten salt used in the gasification process.

Figure 4:
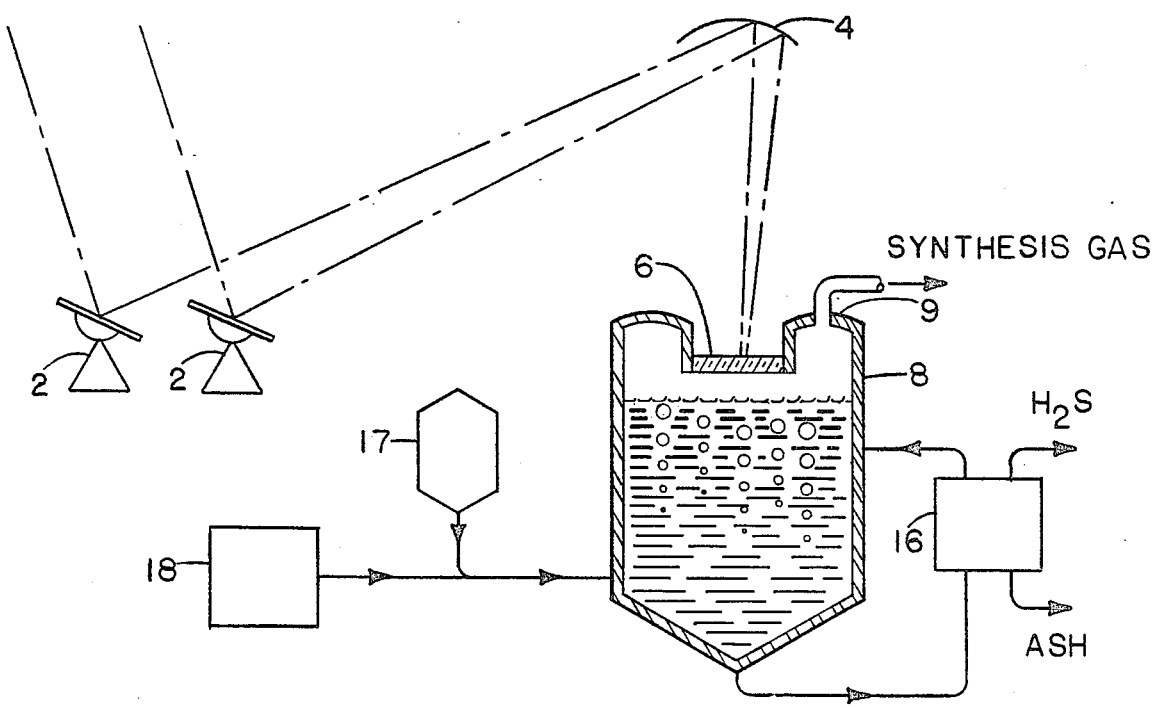
FIG. 4 is a schematic diagram of a second preferred embodiment of my invention.

Referring now to FIG. 4, there is shown apparatus embodying the second preferred embodiment of my invention. In accordance with this embodiment, the molten salt is heated by solar radiation reflected from reflector 4, which passes through a transparent window 6 to be directly absorbed by the molten salt in a combination heating and gasification vessel 8, the structure of which constitutes a principal feature of my invention.

As seen in FIG. 4, the uppermost portion 9 of heating and gasification vessel 8 includes an annular raised portion or dome. Annular dome 9 may be seen to be provided with an outflow pipe whereby the synthesis gas product of the process of my invention is collected and removed.

As also seen in FIG. 4, transparent window 6 is located in the center of the uppermost portion 9 of heating and gasification vessel 8. Transparent window 6 completely fills the inner opening of annular dome 9 and is sealed to the lower end of the cylindrical wall which defines the inner face of annular dome 9. The level of the molten salt in heating and gasification vessel 8 is so maintained that transparent window 6 is not contacted by the hot and probably corrosive molten salt. Thus, transparent window 6 is located below the point of removal of the synthesis gas in annular dome 9.

Thus, the structural features of the heating and gasification vessel of my invention, as just described, make possible the elimination of the pipes, pumps, and valves needed to transport the molten salt from receiver 1 to gasification reactor vessel 7, etc., in the abovedescribed first embodiment of my invention.

In accordance with a further feature of my invention, additives or dopants may be added to the molten salt in heating and gasification vessel 8 of the second preferred embodiment of my invention, or selective solar absorption surfaces may be provided, in order to increase the rate of solar absorption and thus to more efficiently heat the contents of heating and gasification vessel 8 of this embodiment. Suitable additive or dopant materials are described, for example, in an article by William D. Drotning entitled Optical Properties of Solar-Absorbing Oxide Particles Suspended In A Molten Salt Heat Transfer Fluid, found at Volume 20, pages 313 through 319, of *Solar Energy*, Pergamon Press, 1978.

Figure 5:
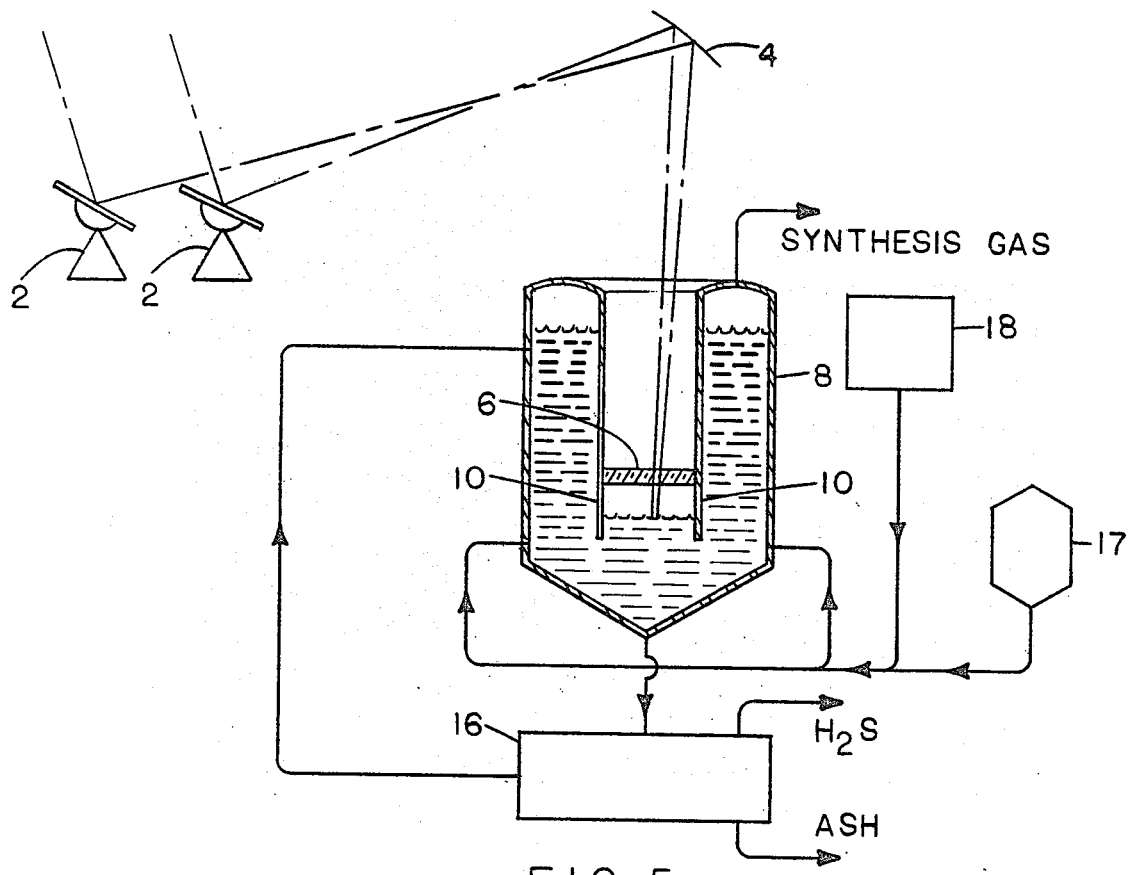
FIG. 5 is a schematic diagram of a third preferred embodiment of my invention.

Referring now to FIG. 5 there is shown a third preferred embodiment of my invention. In this embodiment the combined heating and gasification vessel of my invention, designated by the reference numeral 8 in connection with the second preferred embodiment of my invention, is separated into a heating zone and a gasification zone. The heating of the molten salt in heating and gasification vessel 8 of FIG. 5 will take place in the lower section thereof. The lowermost portion, below transparent window 6, of the downwardly extending cylindrical partition or vessel wall 10 of heating and gasification vessel 8 shown in FIG. 5 serves to create a space between transparent window 6 and the adjacent surface of the molten salt, which space may be filled with an inert gas, thus helping to protect transparent window 6 from the hot and probably corrosive molten salt.

The principal advantage of the third preferred embodiment of my invention occurs when, in accordance with the teachings of my invention, the carbonaceous material to be gasified is introduced into heating and gasification vessel 8 well above the horizontal plane containing transparent window 6. When this is done, the gasification reactions will occur above the level of the open lower end of partition 10, with the result that the synthesis gas in heating and gasification vessel 8 does not come into contact with transparent window 6. This feature of my invention is of particular importance when one or more of the gases formed during the gasification reactions in heating and gasification vessel 8 are such as to corrode or optically degrade the transparent window 6.

Figure 6:
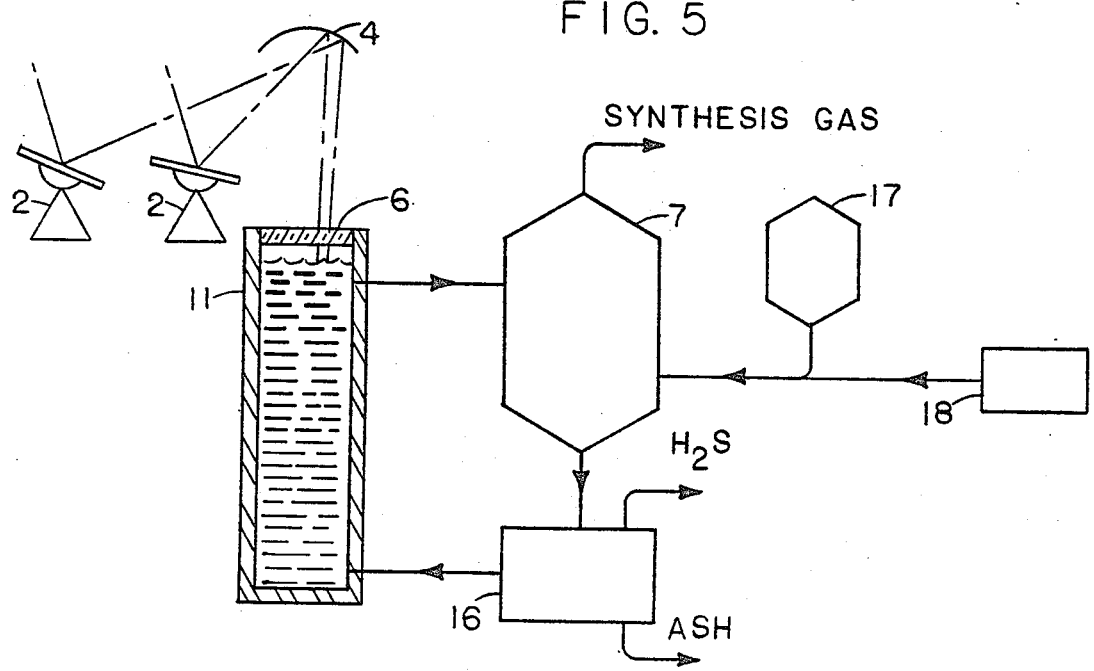
FIG. 6 is a schematic diagram of a fourth preferred embodiment of my invention.

Referring now to FIG. 6, there is shown the fourth preferred embodiment of my invention. In this embodiment of my invention, as in the two previously described embodiments, the concentrated solar rays from reflector 4 pass through a transparent window 6 and thereafter impinge upon the molten salt gasification medium. The primary difference bewteen this fourth preferred embodiment of my invention and the two just previously described embodiments of my invention consists in the employment of separate heating and gasification vessels. The heating vessel is designated by the reference numeral 11. The gasification vessel, designated by the reference numeral 7, may be substantially identical to the gasification vessel 7 of the first preferred embodiment.

In the apparatus of the fourth preferred embodiment the molten salt is heated in vessel 11 by absorbing the concentrated solar rays coming through transparent window 6 of heating vessel 11. After thus being heated, the molten salt is pumped into gasification vessel 7. The principal advantage of this fourth preferred embodiment, like the first preferred embodiment, lies in the fact that gases formed during the gasification processes, which might chemically attack or optically degrade transparent window 6, do not come into contact with transparent window 6. In order to protect transparent window 6 in this preferred embodiment, a space between transparent window 6 and the surface of the molten salt bath 14 may be provided, and the same filled with an inert gas or vacuum for thermal insulation and to protect window 6 from hot corrosive molten salt. As in the previously described second and third preferred embodiments, additives or dopants may be used to increase the rate of solar radiation absorption into molten salt bath 14 thereby increasing the efficiency of the system of this embodiment.

Figure 7:
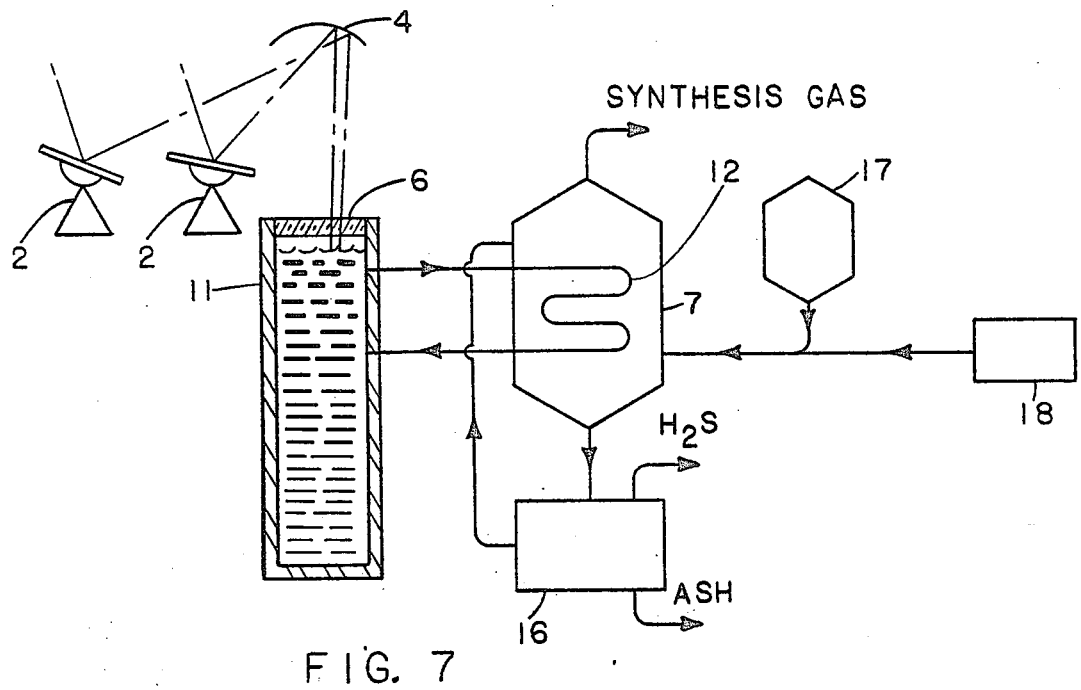
FIG. 7 is a schematic diagram of a fifth preferred embodiment of my invention.

Referring now to FIG. 7, there is shown a fifth preferred embodiment of my invention. In accordance with this fifth preferred embodiment of my invention, a working fluid other than molten salt is employed to absorb the concentrated solar radiation provided by tracking heliostats 2, reflector 4, etc. In accordance with this embodiment, the molten salt gasification medium is heated by means of a heat exchanger 12, which serves to transfer heat from the solar heated working fluid to the molten salt gasification medium. This fifth preferred embodiment of my invention permits the selection of a working fluid having desirable properties, such as stability under the strong heating by the concentrated solar radiation, good solar radiation absorption characteristics, and chemical inertness, i.e., low or no corrosiveness, with respect to heating vessel 11 and transparent window 6. This working fluid may, of course, be a single substance or a mixture of different materials.

Figure 8:
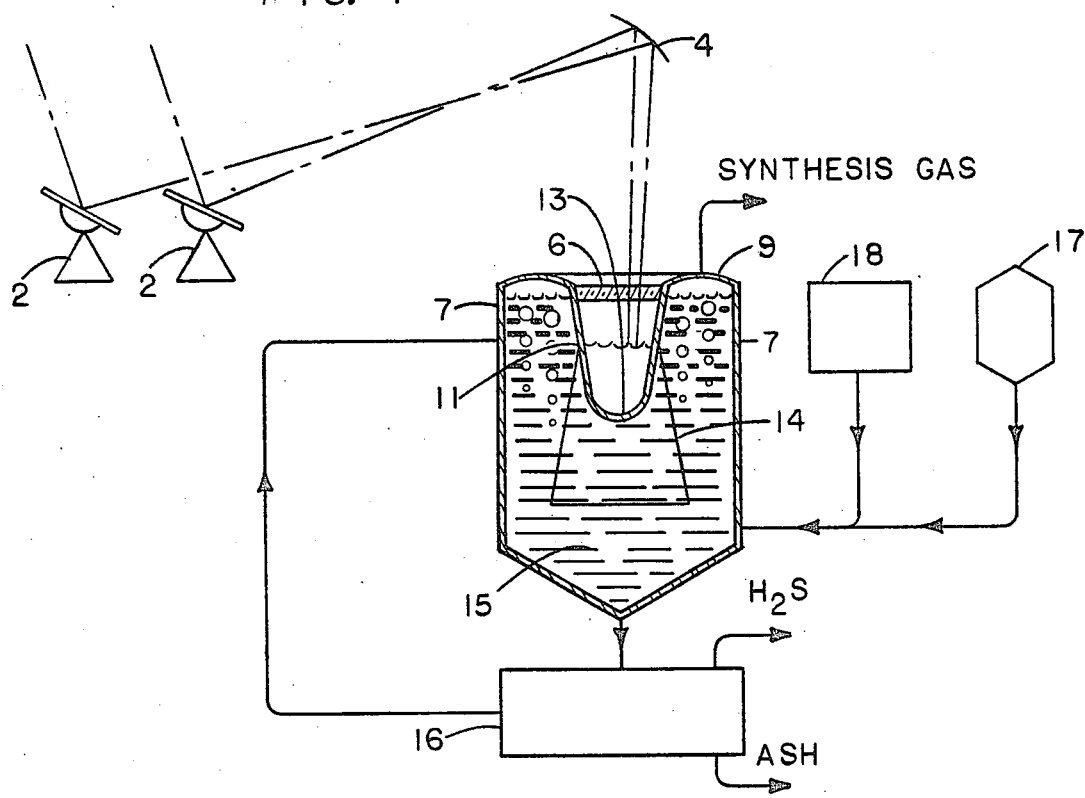
FIG. 8 is a schematic diagram of a sixth preferred embodiment of my invention.

Referring now to FIG. 8, there is shown a sixth preferred embodiment of my invention. In accordance with this embodiment of my invention, the gasification vessel 7 surrounds the heating vessel 11. Heating vessel 11 defines a well 13 which extends deeply into the molten salt bath 14. Heating vessel 11 itself may be formed from suitable metallic or refractory material, e.g., a suitable ceramic or ceramet, and is gastightly joined to the remaining wall portion of heating vessel 11 As seen in FIG. 8, well 13 is closed by a transparent window 6.

In the operation of the apparatus of the sixth preferred embodiment of my invention, concentrated solar radiation reflected by reflector 4 passes through transparent window 6 and impinges upon a suitable working fluid in heating vessel 11, i.e., contained in well 13. The working fluid in well 13 may be provided with a suitable additive or dopant, thereby increasing the rate of solar radiation absorption by the solar-energy-to-heat conversion system of this embodiment. This absorption of solar radiation will raise the fluid in well 13 to high temperature. The high temperature of the working fluid in well 13 will cause heat to be conducted from the working fluid through the walls of heating vessel 11, which projects into molten salt bath 14. Heating vessel 11 may be provided with fins 15, projecting into molten salt bath 14 whereby to increase the rate of heat conduction from heating vessel 11 into molten salt bath 14. A vacuum or inert gas filled space may be provided to separate the working fluid in heating vessel 11 from transparent window 6, thereby tending to reduce the heat losses from heating vessel 11 and also helping to protect transparent window 6 from the hot and possibly corrosive working fluid therein.

Figure 9:
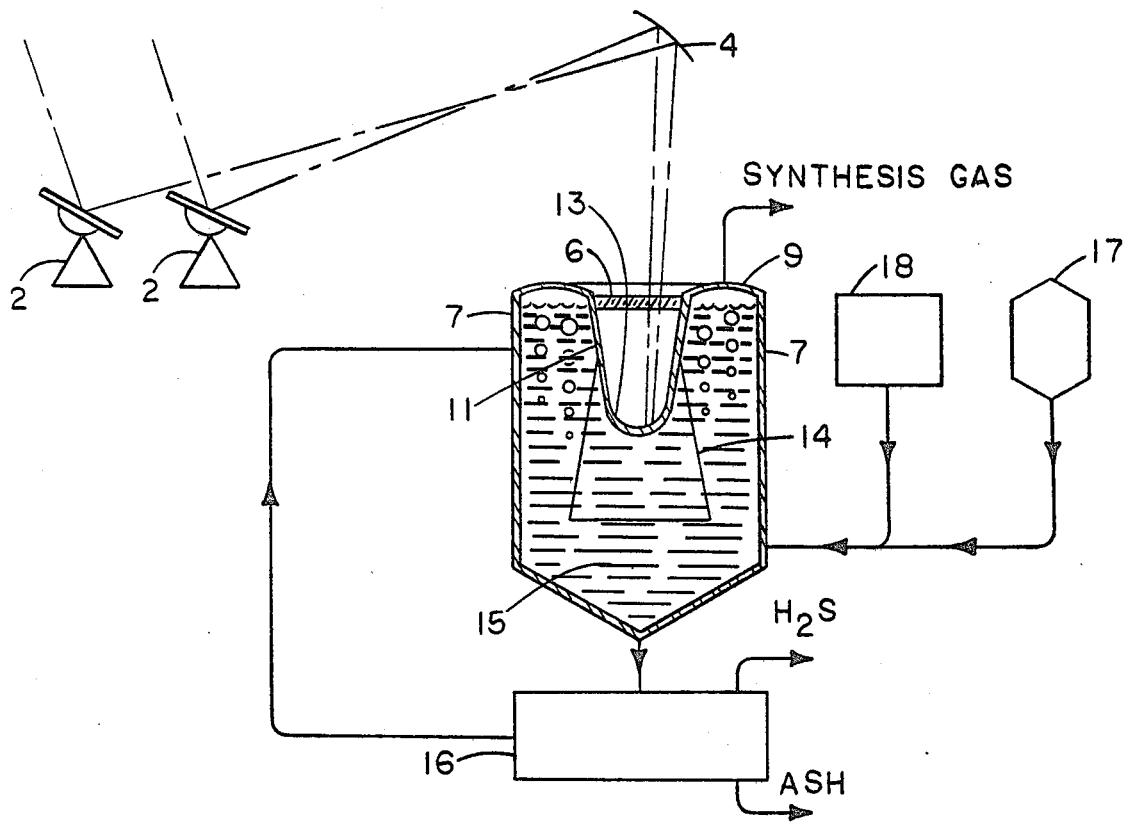
FIG. 9 is a schematic diagram of a seventh preferred embodiment of my invention.

Referring now to FIG. 9, there is shown a seventh preferred embodiment of my invention, which is substantially similar to the sixth preferred embodiment with the exception that no working fluid is contained in heating vessel 11. In accordance with the seventh preferred embodiment, then, heating vessel 11 serves as a heating zone for gasification vessel 7. In the seventh preferred embodiment the concentrated solar radiation reflected by reflector 4 impinges directly upon a wall area of heating vessel 11 after passing through transparent window 6. This wall area of heating vessel 11 is raised to high temperature by absorption of the impingent concentrated solar radiation, and thus conducts heat into molten salt bath 14. It is to be noted that the configuration of well 13 provides increased surface area exposed to molten salt bath 14, which in turn increases the rate of heat conduction into molten salt bath 14. A properly selected surface material may be used to maximize the ratio of absorptivity of solar radiation to emissivity of thermal radiation of the inner solar radiation absorption surface of well 13. As in the previously described preferred embodiment, fins 15 can be used to increase the rate of heat conduction from heating vessel 11 into molten salt bath 14, and, with the selected surface material and the configuration of well 13, achievement of operating temperatures at start-up time can be insured in the least amount of time as well as a maximum amount of time at operating temperatures over a greater range of sky conditions.

It should be noted that in FIGS. 3 and 9, if suitably selected solar radiation absorptive material is applied to the solar radiation impinged surfaces, and in FIGS. 6, 7, and 8, if a suitably selected working fluid is used, it may be possible to dispense with transparent window 6. As previously noted, however, transparent window 6 can provide major advantages, such as significantly reducing heat losses by allowing the creation of a vacuum between the solar radiation impinged surface and transparent window 6. Window 6 will reduce heat losses through radiation, conduction, or convection, and will also serve to prevent the solar radiation impinged surface or surfaces from coming into contact with the atmosphere, which will in turn prevent the solar radiation impinged surface, whether the surface of a solid or the surface of a fluid, from reacting with the gases in the atmosphere, especially the oxygen in the atmosphere. Reduction in heat loss may be achieved by interposition of transparent window 6 without the creation of a vacuum therebehind, but the reduction in heat loss without the vacuum will be less.

In the abovedescribed embodiments of my invention a downward onto the ground-surface-mounted central receiver 1. As noted hereinabove, the employment of downwardly-directed reflector 4, which is a characteristic feature of my invention, provides great advantage by way of increasing the focal length of the solar ray concentration system, and allowing central receiver 1 to be built on the ground in flat terrain. In addition to the cost-savings attendant upon the building of central receiver 1 on the surface of the earth, rather than on an elevated tower, other advantages are attained by making use of the downwardly directed reflector 4 of my invention. In some embodiments of my invention, the use of downwardly-directed reflector 4 helps to protect transparent window 6 by making it impossible to locate transparent window 6 at the top of the central receiver, gasification vessel, or heating and gasification vessel, rather than at the bottom thereof, since the top-located transparent window 6 of my invention can be separated from the working fluid or gasification medium, and at the same time the transparent window can be non-load bearing, not having to support the weight of the working fluid or gasification medium in the central receiver, gasification vessel, or heating and gasification vessel.

The processes and apparatus for heating the molten salt described hereinabove can be used to store solar energy and make it available during periods of cloudiness or at night for purposes other than the gasification of carbonaceous material. For instance, the gaseous medium heating means of one of the embodiments of my invention described hereinabove may be used to store solar energy for the purpose of generating electricity thermoelectrically. In this application of my invention, the molten salt or other working fluid could be heated during periods of sunshine, and the solar energy stored in the molten salt or other working fluid utilized later as dictated by the then current demand for electricity.

As will be evident to those having ordinary skill in the art, informed by the present disclosure, it is preferred that the fluid in the heating vessel be a liquid, rather than a gas, since liquids in general have much higher solar absorptivity per unit volume than gases, and also much higher thermal conductivity per unit volume and much higher thermal capacity per unit volume.

In carrying out the processes of my invention, making use of the molten gasification medium heating means of one of the several abovedescribed embodiments of apparatus of my invention, the steps of charging carbonaceous material to the molten gasification medium, extracting synthesis gas, disposing of waste and byproducts, etc., may be substantially like the corresponding steps of known molten gaseous medium gasification processes, as taught, e.g., in U.S. Pat. Nos. 3,708,270; 3,567,412; 3,252,773; and 3,916,617.

Typical post-heating processing steps which may be followed in carrying out one of the processes of my invention using one of the apparatus embodiments of my invention described hereinabove may be generally described as follows, thus putting the subject matter thereof within the scope of one having ordinary skill in the art as informed by the present disclosure.

In this description it will be assumed that the molten gasification medium is molten $Na_2CO_3$, which has been proven to be a very effective molten salt for use in carbonaceous material gasification processes. It is to be understood, however, that other molten salts or various mixtures of molten salts may be employed in carrying out the processes of my invention.

This molten salt, $Na_2CO_3$, will either be heated in a gasification vessel 7 or in a separate heating vessel 11 as described hereinabove. If heated outside the gasification vessel, the molten gasification medium will be pumped to gasification vessel 7 as described hereinabove. Hot steam and a solid carbonaceous material will then be introduced into the bottom section of reactor vessel 7. The carbonaceous material feedstock may be shredded, ground, crushed, milled, or otherwise comminuted, in the judgment of one having ordinary skill in the art, bearing in mind the economics of the system. The hot steam may be provided by solar heating, by the use of heat exchangers to obtain heat from the product synthesis gas as it leaves gasification reactor vessel 7 and/or by the use of heat exchangers to obtain heat from the molten salt as it leaves the gasification reactor vessel 7. The hot steam can be used to carry the particles of carbonaceous material into reactor vessel 7, and also to remove the air from the stream of carbonaceous material.

Turbulence may be induced in reactor vessel 7 in order to increase the gasification rate. The movement of gases and liquids in reactor vessel 7 and/or mechanical agitators may be used to create turbulence in reactor vessel 7.

As the steam and carbonaceous material moves up through molten salt bath 14 in reactor vessel 7, the strong heating action of the molten $Na_2CO_3$, the catalytic action of the molten $Na_2CO_3$, and the turbulence in molten $Na_2CO_3$ bath 14 will cause the carbonaceous material to pyrolyze at a rapid rate. As a result, the carbonaceous material will break down into synthesis gas consisting of CO, $H_2$, $CH_4$, $CO_2$, and steam, carbon in the form of char, ash, and sulfur in the form of sulfide ions.

The high temperatures used for the gasification reactions, the rapid heating of the carbonaceous material due to these high temperatures, the high heat capacity of the molten salt, the good heat conductivity of the molten salt, and the even temperature distribution of the molten salt bath 14 will curtail the formation of tars, oils and liquors during the pyrolysis reactions. Any tars, oils and liquors formed during the pyrolysis reactions will be induced to crack into more CO, $H_2$, $CH_4$, $CO_2$ and steam by the strong catalytic action of the molten $Na_2CO_3$ and the readily available heat from the molten $Na_2CO_3$ bath 14. Experiments done with coal as the carbonaceous matter have shown that the coal will gasify completely to a synthesis gas with no tars, oils or liquors in the product synthesis gas when molten $Na_2CO_3$ is used to gasify the coal.

The char will, under the strong heating and catalytic actions of the molten $Na_2CO_3$, and the presence of steam in the gasification reactor vessel 7, react with the steam in accordance with the known carbon-steam reaction to form more $H_2$ and CO (Equation 1, infra). The major reactions in the gasification of solid or liquid carbonaceous matter besides the pyrolysis reactions which occur in reactor vessel 7 are:

Equation 1. $C + H_2O \rightarrow CO + H_2$ (carbon-Steam reaction)
Equation 2. $CO + H_2O \rightleftharpoons H_2 + CO_2$ (water gas reaction)
Equation 3. $C + CO_2 \rightarrow 2CO$ (carbon-Carbon dioxide reaction.)
Equation 4. $C + 2H_2 \rightarrow CH_4$ carbon-$H_2$ reaction)
Equation 5. $3H_2 + CO \rightarrow CH_4 + H_2O$ (formation of $CH_4$ in reactor)
Equation 6. $2H_2 + 2CO \rightarrow CH_4 + CO_2$ (formation of $CH_4$ in reactor)
Equation 7. $Na_2CO_3 + H_2O \rightarrow NaOH + CO_2$ (hydrolysis of $N_2CO_3$ in reactor)

Some of the $CO_2$ formed by the pyrolysis reactions and the hydrolysis of $Na_2CO_3$ (Equation 7) will react with the char to form more CO (Equation 3). If desired, $CO_2$ may be added to reactor vessel 7 with the hot steam to promote Equation 3 and depress Equation 7. If suitable catalysts are found, it may be desirable to replace the steam with $CO_2$ to react with the char to form more CO in accordance with Equation 3. The probabilities of this happening appear to be small.

Some of the $H_2$ formed during the pyrolysis reactions will react with the char to form $CH_4$ (Equation 4). At this time it is believed that the carbon-steam reaction (Equation 1) is the primary reaction in the gasification process, and that the carbon-$CO_2$ reaction (Equation 3) and the carbon-$H_2$ reaction (Equation 4) are secondary reactions in the molten salt gasification process. The water gas reaction (Equation 2) alters the proportion of CO, $H_2$, $CO_2$ and steam in the raw synthesis gas product.

The proportion of $CH_4$ in the synthesis gas can be increased if desired by altering conditions in reactor 7 to favor Equations 4, 5 and/or 6. A side reaction which is generally considered to be undesirable is the hydrolysis of the molten $Na_2CO_3$ to form NaOh and $CO_2$ (Equation 7). This reaction will increase the proportion of $CO_2$ in the raw synthesis gas and increase the amount of $Na_2CO_3$ which must be made up. The use of $K_2CO_3$ will alleviate this problem as $K_2CO_3$ will hydrolyze to a lesser degree than $Na_2CO_3$ under the same gasification conditions. However, $K_2CO_3$ is more expensive than $Na_2CO_3$.

All the gases formed during the gasfication of the carbonaceous material in reactor vessel 7 will collect at the top of reactor vessel 7. These gases, which make up the raw synthesis gas, will be removed from the top of reactor vessel 7 and sent to the clean-up and purification section where any impurities in the synthesis gas will be removed. The synthesis gas can then be enriched by removal of the $CO_2$ and $H_2O$. The synthesis gas will then be used as a fuel or used as a raw material in the production of other synthetic fuels or chemicals. Reactions which can be used to utilize the synthesis gas after it leaves the reactor are:

Equation 2. $CO + H_2O \rightarrow H_2 + CO_2$ (water gas reaction)
Equation 5. $3H_2 + 2CO \rightarrow CH_4 + H_2O$ (synthesis of methane)
Equation 6. $2H_2 + 2CO \rightarrow CH_4 + CO_2$ (synthesis of methane)
Equation 8. $CO + 2H_2 \rightarrow CH_3OH$ (synthesis of methanol)
Equation 9. $N_2 + 3H_2 \rightarrow 2NH_3$ (synthesis of ammonia)

Suitable catalysts known to those having ordinary skill in the art will be used in the synthesis of methane, methanol and ammonia.

The water gas reaction (Equation 2) can be used to alter the proportion of $H_2$ and $CO$ in the synthesis gas after removal from gasification vessel 7. This reaction can be used to obtain nearly pure hydrogen by making Equation 3 go to the right to the extent that is economically and technically feasible.

After alteration to proper proportions, the synthesis gas can be converted to methane by use of Equations 5 or 6 or methanol by means of Equation 8 or ammonia by a means of Equation 9. There will be some methane in the synthesis gas as it leaves the reactor, which will facilitate the production of methane from the synthesis gas. As mentioned previously, The proportion of methane in the raw synthesis gas can be increased by manipulating the conditions in gasification reactor vessel 7. A synthetic gasoline can be produced from methanol using a process recently developed by Mobil Oil Company.

During the gasification reactions, ash and sulfur from the carbonaceous material will be incorporated into molten $Na_2CO_3$ bath 14. The sulfur is converted into sulfide ions and becomes part of molten salt bath 14. A portion of the sulfur will be dissolved in the ash and the rest will be present as a solid or liquid contaminant of molten salt bath 14. A portion of the ash must be continuously or periodically removed from molten salt bath 14 to keep the concentration of ash in molten salt bath 14 within allowable limits for good gasification rates.

At the bottom section of reactor vessel 7 there will be a settling zone. The ash will settle toward this settling zone, resulting in molten $Na_2CO_3$ bath 14 having a higher concentration of ash in this settling zone.

The molten $Na_2CO_3$ at the bottom of the settling zone will be siphoned off from the settling zone and sent to the impurities removal section 16. Here the ash and sulfide ions will be removed from the molten $Na_2CO_3$. A process for removing impurities from salts such as $Na_2CO_3$ which is being used in the conventional molten salt gasification process is described in U.S. Pat. Nos. 3,710,737 and 3,708,270.

The processes and apparatus described above do not encompass all the processes and apparatus for practicing the solar molten salt gasification processes of my invention. Thus, this description is not intended to encompass all the possible processes and apparatus which can use solar energy as the heat source for the molten salt gasification processes of my invention.

Alternative processes and apparatus for practicing the solar molten salt gasification processes of my invention are described below.

The first alternative is to use $K_2CO_3$, $LiCO_3$ or any one of the many possible eutectics formed by mixing together alkalai metal carbonates in place of $Na_2CO_3$ as the molten salt in the above-described gasification processes of my invention.

The second alternative is to employ a separate vessel to clarify by settling the ash in the used molten salt. This will allow use of vigorous turbulence in the reactor vessel to enhance gasification rates, and good quiescent settling conditions in a separate clarification vessel.

The third alternative is to eliminate or substantially reduce the amount of steam introduced into reactor 7. This will substantially reduce the carbon-steam reaction (Equation 3) and result in carbon in the form of char being removed from the reactor. This char will float on the molten salt and, when separated from the molten salt, will be a valuable by-product.

The fourth alternative is to clean only a portion or none of the used molten salt instead of purifying the entire amount of used molten salt being removed from reactor vessel 7. The unpurified molten salt will either be recycled back to reactor vessel 7, resulting in an increase in the concentration of ash in the molten salt bath in vessel 7, or disposed of without purification. Use of an inexpensive salt and high allowable concentrations of ash in the molten salt bath during the gasification process will favor this modification.

The fifth alternative is to directly separate the ash from the molten salt without going through the purification procedure outlined above. A portion or all of the used molten salt will be sent to an ash removal section adapted for filtering the ash from the molten salt or using centrifugation to separate the ash from the molten salt. This alternative will be enhanced if only a small portion of the ash will dissolve in the molten salt.

The sixth alternative will be used with the fifth alternative and will remove the sulfur in the molten salt which is not removed by direct filtration or centrifugation. The concentration of the sulfide ion in the reactor vessel may be allowed to increase until the sulfur forms hydrogen sulfide gas. The reaction is:

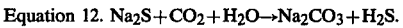

Equation 12. $Na_2S + CO_2 + H_2O \rightarrow Na_2CO_3 + H_2S$.

The hydrogen sulfide will mix with the raw synthesis gas in reactor vessel 7 along with the raw synthesis gas. The hydrogen sulfide will then be removed from the synthesis gas using conventional procedures. This modification allows use of a molten salt purification procedure which does not remove the sulfur in the form of the sulfide ion from the used molten salt, such as the direct filtration or centrifugation purification method mentioned above.

It will be noted that in FIGS. 3 through 9 the carbonaceous material is fed from the carbonaceous material lock hopper 17 into reactor vessel 7 or gasification and heating vessel 8 (FIGS. 4 and 5) by means of steam from a steam generator 18.

It will thus be seen that the objects set forth above, among those made apparent from the preceding description, are efficiently attained, and since certain changes may be made in the above processes and apparatus without departing from the scope of my invention, it is intended that all matter contained in the above description or shown in the accompanying drawings shall be interpreted as illustrative only, and not in a limiting sense.

It is also to be understood that the following claims are intended to cover all of the generic and specific features of my invention hereindescribed, and all statements of the scope of my invention which, as a matter of language, might be said to fall therebetween.

What is claimed is:

1. Apparatus for storing solar energy in synthetic fuel, comprising:

a reactor vessel having a solar radiation pervious window in its upper surface and containing a gasification medium;

directing means for directing solar radiation through said window and onto said gasification medium to raise the temperature of said gasification medium to a temperature at which carbonaceous material and steam react to produce gaseous product;

a supply vessel containing carbonaceous material;

a steam generator;

means for transferring steam and carbonaceous material from said steam generator and said supply vessel into the gasification medium in said reactor vessel;

purifying means for removing byproducts of the reaction of said steam and said carbonaceous material from said gasification medium;

means for transferring gasification medium from said reactor vessel to said purifying means;

means for transferring purified gasification medium from said purifying means to said reactor vessel; and means for withdrawing gaseous product from said reactor vessel;

said reactor vessel being provided with partition means depending from the upper portion of the reactor vessel and surrounding said window, said partition means defining with the portion of said reactor vessel lying above said gasification medium an annular chamber defining with said window a central chamber, said partition means extending into said gasification medium and defining below the surface thereof an opening into said central chamber, and said means for transferring steam and carbonaceous material into said reactor vessel passing into said annular chamber at a point above said opening into said central chamber, whereby said window is protected from said molten gasification medium by a body of gaseous reaction product in the upper part of said central chamber.

* * * * *